G. POLLARD.
VARIABLE SPEED GEARING.
APPLICATION FILED JULY 29, 1915.

1,208,644.

Patented Dec. 12, 1916.
4 SHEETS—SHEET 1.

INVENTOR
George Pollard
by Howson and Howson
Attys.

G. POLLARD.
VARIABLE SPEED GEARING.
APPLICATION FILED JULY 29, 1915.

1,208,644.

Patented Dec. 12, 1916.
4 SHEETS—SHEET 3.

INVENTOR
George Pollard
by Howson and Howson
Attys.

G. POLLARD.
VARIABLE SPEED GEARING.
APPLICATION FILED JULY 29, 1915.

1,208,644.

Patented Dec. 12, 1916.
4 SHEETS—SHEET 4.

INVENTOR
George Pollard
by Howson and Howson
Attys.

UNITED STATES PATENT OFFICE.

GEORGE POLLARD, OF PICCADILLY, LONDON, ENGLAND, ASSIGNOR TO MENCO-ELMA SYNDICATE LIMITED, OF LONDON, ENGLAND.

VARIABLE-SPEED GEARING.

1,208,644.   Specification of Letters Patent.   Patented Dec. 12, 1916.

Application filed July 29, 1915.   Serial No. 42,529.

*To all whom it may concern:*

Be it known that I, GEORGE POLLARD, a subject of the King of Great Britain, residing at 8 Clarges street, Piccadilly, in the county of London, England, have invented new and useful Improvements in, and Relating to Variable-Speed Gearing, of which the following is a specification.

This invention relates to variable speed gearing of the electro-magnetic type, and has for its object to provide means, whereby the use of electric current for driving purposes, can be avoided, when it is desired to run on direct drive, or top speed.

According to this invention I provide means whereby the transmission of power from the driving shaft to the driven shaft, when running on direct drive or top speed, can be effected mechanically, thereby avoiding the use of electric current and consequently reducing the running costs of the motor. The driving shaft and driven shaft are electro-magnetically coupled, or connected, by gearing to effect the various reduced speeds within the limits of the particular gearing used, and the said mechanical means may be so arranged that the electric current used to effect the electro-magnetic coupling, or engagement of the driving and driven members, may be utilized to render the said mechanical means inoperative, or to so act thereon as to withdraw the said means from the engaging, or operative, position.

The construction, and arrangement, of the aforesaid mechanical means is preferably such that no current for driving purposes is consumed either on direct drive, or top speed, or when the engine is running free.

I will describe, with reference to the accompanying drawings, constructions in accordance with this invention, but I do not limit myself to the precise constructions described and illustrated.

Figure 1:
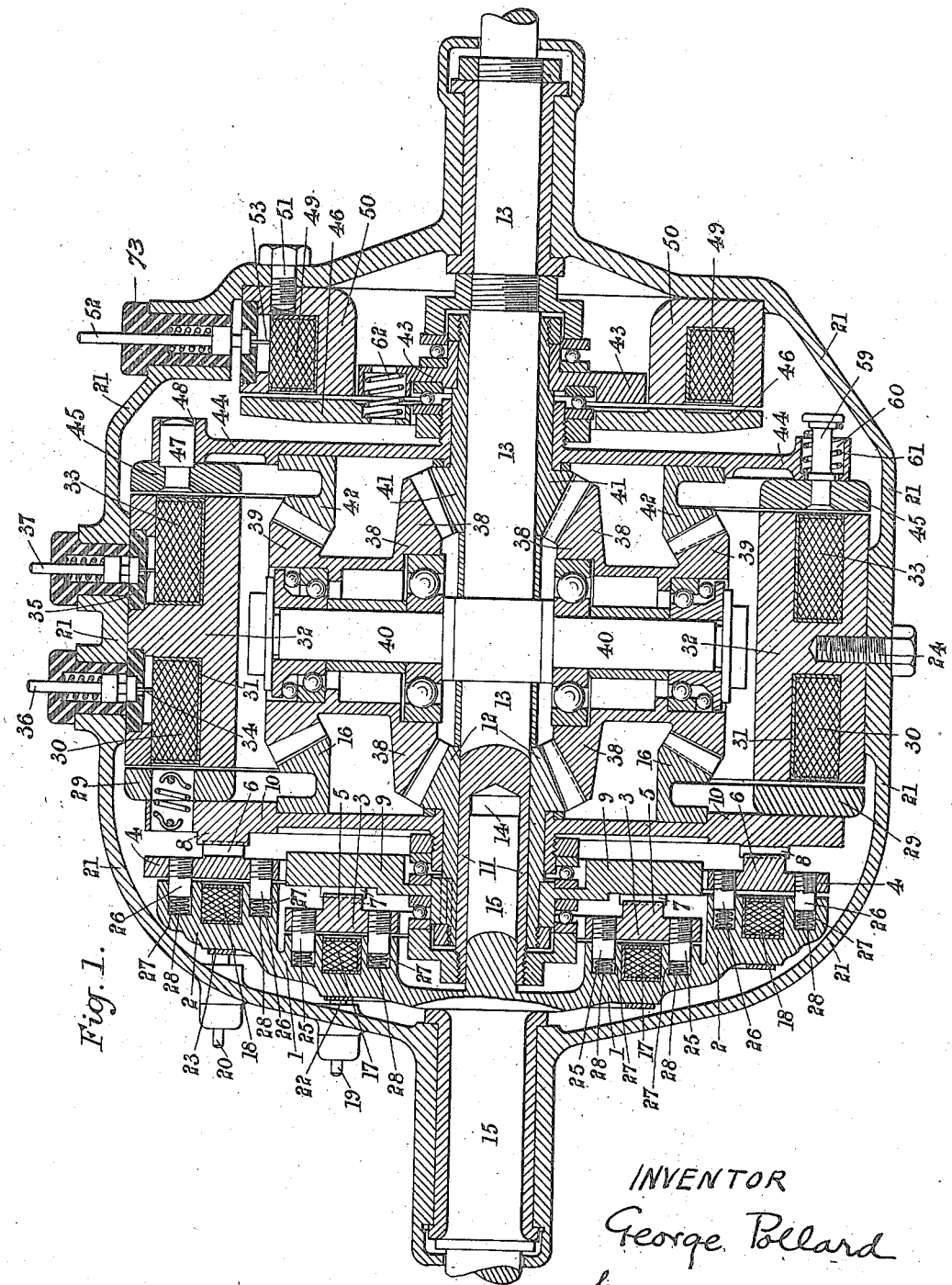
Figure 2:
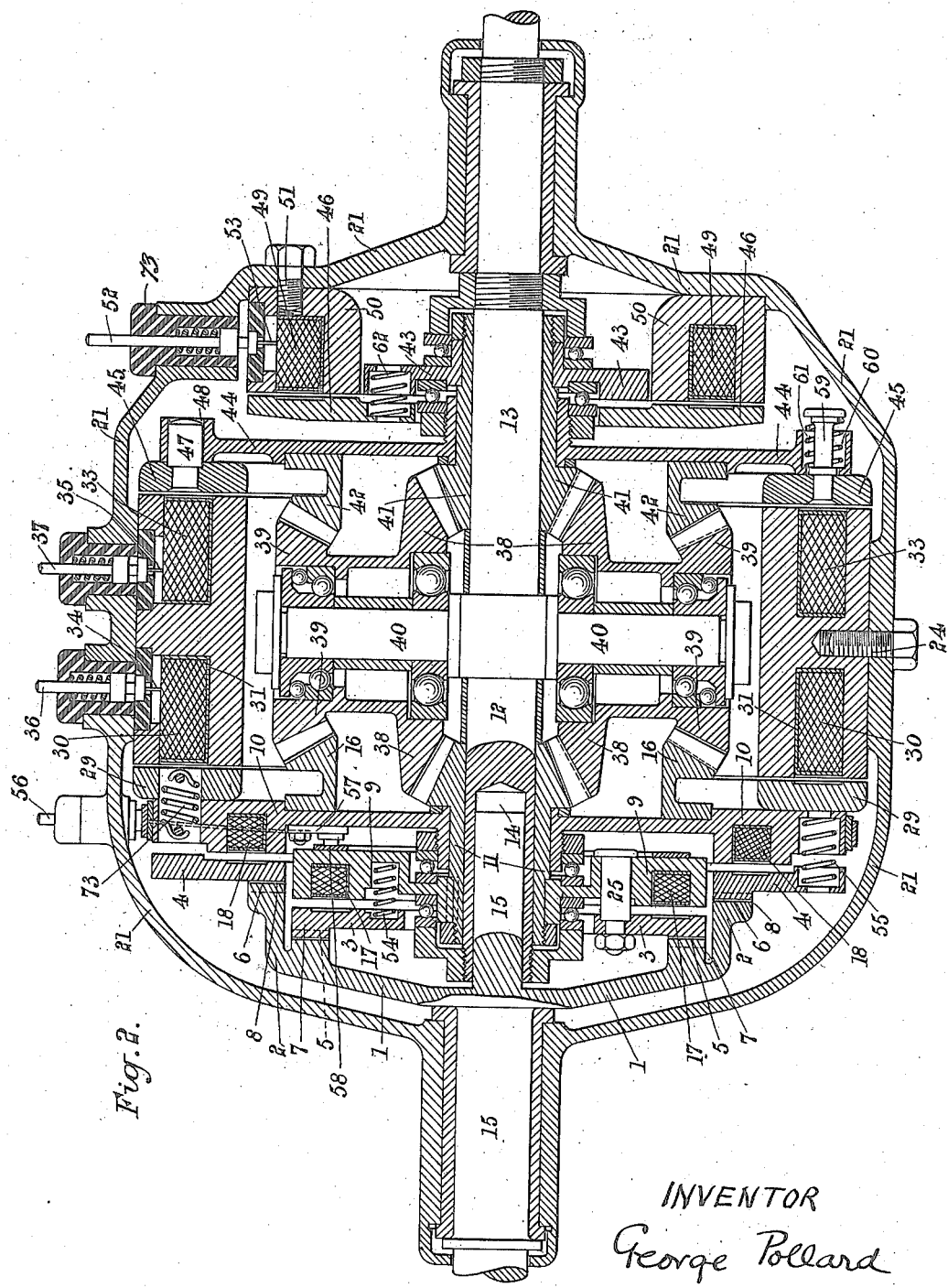
Figure 3:
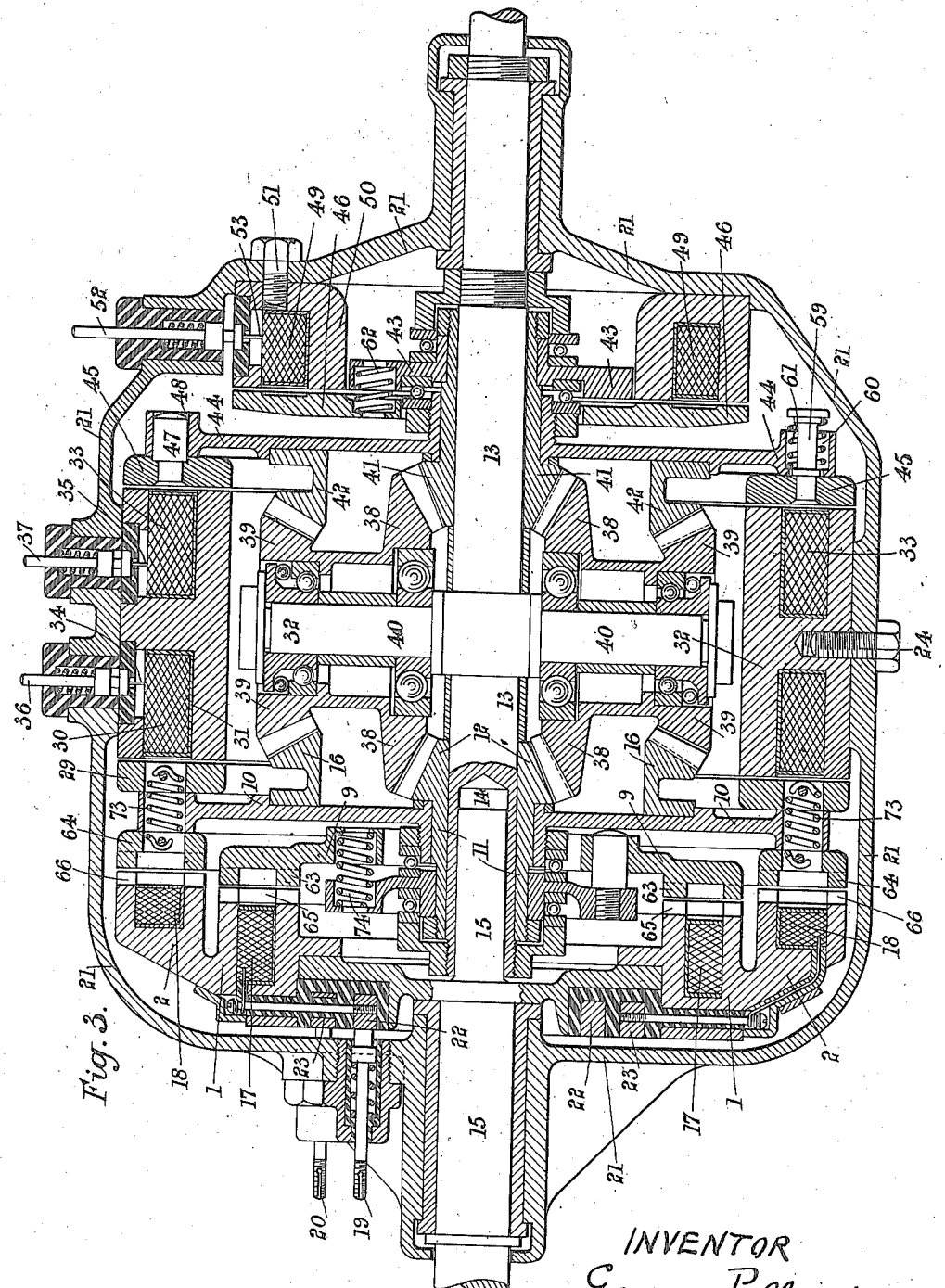
Figure 4:
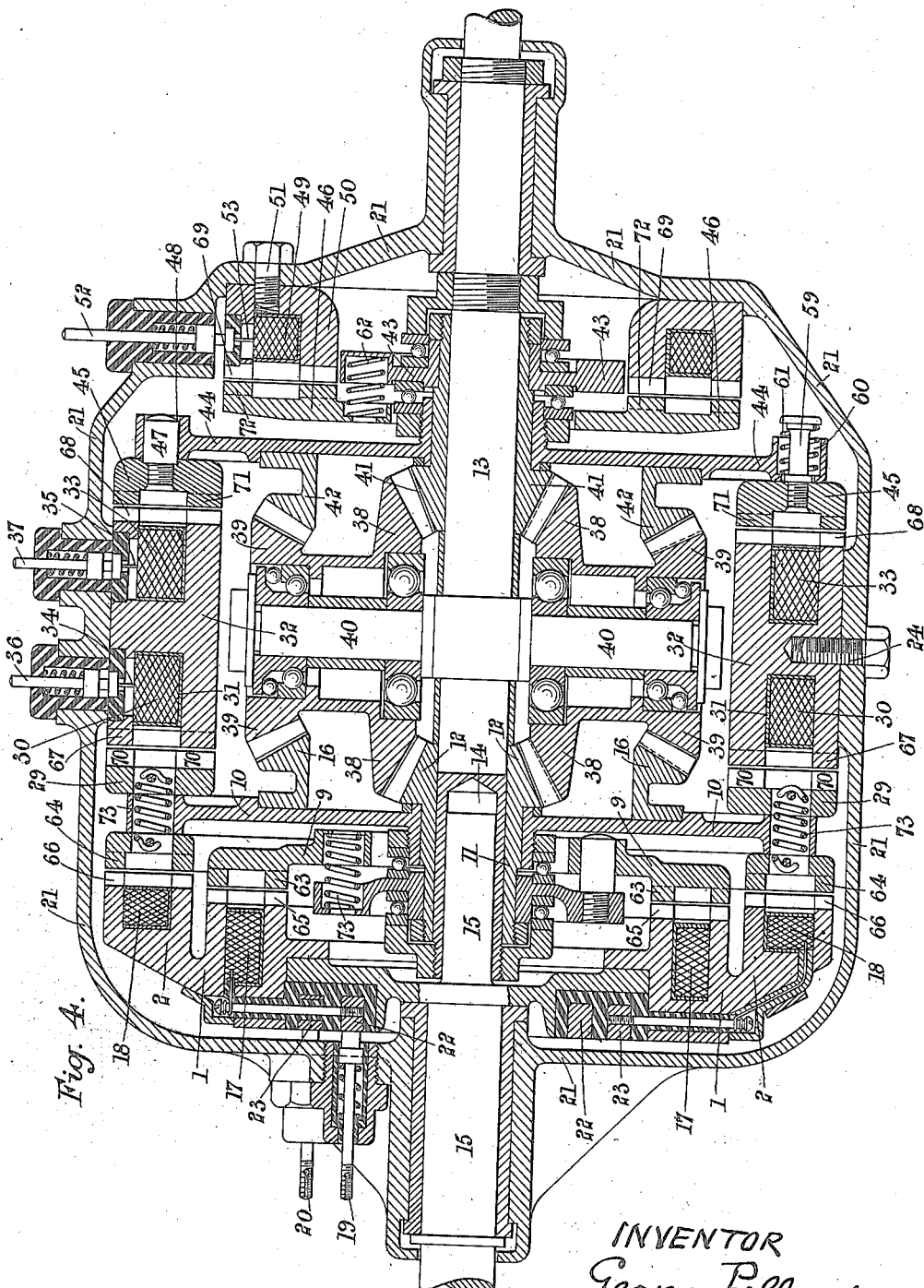

Figure 1 is a sectional plan of a variable speed gear in accordance with this invention. Figs. 2, 3, and 4, show in sectional plan, modified arrangements of the gearing shown in Fig. 1.

Throughout the figures of the drawings, the same reference numerals indicate the same or similar parts.

In the variable speed gearing illustrated in Fig. 1, the driving members 1, 2, which may be integral, or secured in such manner as to rotate together, are provided with movable parts 3, 4, having projections 5 and 6, arranged to engage recesses 7, 8, in the driven members 9, 10, the driven member 9, being keyed, or otherwise secured to a sleeve 11, projecting from a bevel toothed wheel 12, loosely mounted on the driven shaft 13, which is recessed as at 14, so as to form a bearing for the end of the driving shaft 15. The driven member 10, is loosely mounted on the sleeve 11, and is provided with a bevel toothed wheel 16, the bevel toothed wheels 12 and 16, forming the driving wheels of the gearing, and these are hereafter referred to as the driving sun wheels. In the construction shown in Fig. 1, the driving members 1, 2, are formed integral with the driving shaft 15, (but they need not be so formed) and they are provided with annular recesses in which are placed coils 17, 18, of wire preferably copper wire. Contact terminals 19, 20, are mounted on the casing 21, of the gearing, electric current being conveyed thereto by any suitable and well-known means, and from any suitable source of supply. The contact terminals 19, 20 are arranged to bear against the terminals 22; 23, of the members 1, 2, leads being taken therefrom to the coils 17, 18, respectively. The movable parts 3, 4, are provided with projecting pins 25, 26, respectively which enter recesses 27 in the driving members 1, 2, and these movable parts are maintained in the operative position for direct drive by springs 28, arranged in the recesses 27 in the driving members 1, 2. When the coils 17, 18, are energized the movable parts 3, 4, operate as the armatures of the electro-magnets formed by the adjacent faces of the driving members 1, 2. The driven member 10, is provided with a suitable armature formed as a disk, 29, which carries pins (not shown, but similar to the pins 47) secured therein and capable of sliding against the action of the springs 73 in holes in the driven member 10, under the action of the electro-magnetic force generated by an electric current passing through the coil 30. This latter coil is stationary, and is arranged in an annular recess 31 in a suitable carrying piece 32 which is secured to the casing 21 by pins 24. The carrying piece 32 is adapted to support another stationary coil 33, electric current being led to the respective coils 30 and 33 by wires 34, 35, connected to suitable contact terminals 36, 37, to which current is supplied from any suitable source, such for example, as a battery, or one or more accumulators or a dynamo. The terminals 19, 20, 36 and 37 are insulated from the casing 21, by vulcanite, fiber, or other suitable material.

The driving sun wheels 12 and 16 are arranged to engage with an inner planet wheel 38 and an outer planet wheel 39, both planet wheels being mounted on a shaft 40, at right angles to, and rigidly connected with, the driven shaft 13. If desired there may be more than one set of inner and outer planet wheels, an inner planet wheel and an outer planet wheel of each set being essentially integral or rigidly connected together, and suitably supported by ball bearings as shown in the drawings.

On the driven side of the planetary axis are arranged two bevel toothed wheels 41, 42 which engage the planet wheels 38, 39, the wheels 41 and 42 being secured to disks 43, 44, respectively and the sun wheel 41 being loosely mounted on the driven shaft 13. The disks 43, 44, are each provided with a disk armature 45, 46, which carry pins such as 47, and 59, capable of sliding against the action of springs 61, 62, in recesses such as 48, and 60, in each of the disks 43, 44, only the pins and recesses in the disks 45 and 44 respectively being shown in the drawings. The disk armatures 45, 46, are arranged adjacent to the coils 33 and 49 respectively, the latter coil being suitably supported in an annulus 50 maintained in position on the casing 21 by pins 51. Current is supplied from the contact terminal 52 to the coil 49 by the lead 53.

In describing the action of the gearing it is to be understood that the parts 3, 4, 29, 45, and 46, are movable under the electromagnetic action and that the coils 30, 33, and 49 are stationary at all times.

In order to obtain the first speed the coils 18 and 33 are energized, thereby disengaging the part 4 and the member 10 and holding, or retarding, the disk armature 45 so that the sun wheel 12 acts as driver and causes the shaft 40 to rotate thereby driving the driven shaft 13. To obtain the second speed the coils 17 and 33 are energized thereby disengaging the part 3 and the member 9 and holding or retarding the disk armature 45. The sun wheel 16 now acts as driver and the sun wheel 42 remains stationary so that the shaft 40 is rotated and drives the shaft 13. The third speed is obtained by energizing the coils 17 and 49, thus disengaging the part 3 and the member 9 and holding or retarding the sun wheel 41. The fourth speed or direct drive is effected by deënergizing all the coils, and allowing the sun wheels and planet wheels to rotate *en bloc*.

The reverse drive is effected by energizing the coils 18 and 30, so as to disengage the part 4 and the member 10 and hold stationary the said member 10 and thereby the sun wheel 16, so that the planetary axis 40 and consequently the driven shaft 13 are rotated in the reverse direction to that of the driving shaft.

In the construction shown in Fig. 2 the coils 17, 18 are placed in the driven members 9 and 10 and the movable parts 3, 4, are interposed between the said driven members and the driving members 1, 2, the projections 5, 6, in this case being arranged to engage recesses 7, 8, in the driving members 9, 10. In this figure only the pins 25 are shown it being inconvenient to show the pins 26 which are exactly the same as the pins 25. The movable parts 3, 4, are maintained in engagement with the driving members 1, 2, by springs 54, 55, which respectively bear on the movable part 3 and the driven member 9, and the movable part 4 of the driven member 10. Current can be supplied to the coils 17, 18 from the contact terminal 56 to the coil 18 and to the contact 57 which makes rubbing contact with the terminal 58 and from which latter terminal connection is made to the coil 17. The action of this gearing is as follows:—By energizing the coils 18 and 33, the movable part 4 is disengaged from the driving member 2, the disks armature 45 and consequently the sun wheel 42 being held against rotation so that the shaft 40 is caused to rotate and so drive the shaft 13, thus giving the first speed. To obtain the second speed the coils 17 and 33 are energized, so that the movable part 3 is disengaged from the driving member 1, the disk armature 45 and the sun wheel 42 being held against rotation, thereby rotating the shaft 40. The third speed is effected by energizing the coils 17 and 49 the effect of which is to disengage the parts 1 and 3 and hold the disk armature 46 and sun wheel 41, which causes the shaft 40 to rotate. The direct drive or top speed (motor speed) is obtained by deënergizing all the coils and allowing the gearing to rotate *en bloc*. By energizing the coils 18 and 30 thereby disengaging the parts 2 and 4 and holding the member 10 and the sun wheel 16 against rotation, the driving shaft 13 is caused to rotate in the reverse direction to that of the driving shaft 15.

In the construction shown in Figs. 3 and 4 the driven members 9, 10, are provided with projections or teeth 63, 64, which engage corresponding recesses 65, 66, in the driving members 1, 2, either, or both, of the driven members 9, 10, being coupled to the driving members 1, 2, under the electromagnetic action of either or both of the coils 17, 18, when energized. The coils 17, 18, are supplied with current from the contact terminals 19 and 20, through the rubbing contacts 22, 23. In this construction the driven members are normally disengaged from the driving members 1, 2, by the springs 73, 74.

In Fig. 4 I have shown the carrying piece 32, and the annulus 50, as being provided with projections or recesses, 67, 68, and 69, adapted to engage corresponding recesses, or projections, 70, 71, and 72, on the disk armatures 29, 45, and 46.

What I claim is—

1. In a variable speed gear of the epicyclic type, driving and driven members, gearing for establishing variable speed connection between the same, electromagnetic means for controlling said variable speed connections, clutch means for establishing a direct-drive connection, and spring means, operative only on the deënergization of said electromagnetic means, for establishing the direct drive clutch connection.

2. In a variable speed gear of the epicyclic type, driving and driven members, gearing for establishing variable speed connections between the same, electromagnetic means for controlling said variable speed connections, a plurality of clutch devices for effecting a direct drive connection between said driving and driven members, mechanical means constantly tending to establish said direct drive connection, and electromagnetic means to overcome said mechanical means and open certain of said clutch devices to vary the drive connection.

3. In a variable speed gear of the epicyclic type, driving and driven members, gearing for establishing variable speed connections between the same, electromagnetic means for controlling said variable speed connections, a plurality of clutch devices for effecting a direct drive connection between said driving and driven members, spring means for maintaining said clutch devices normally closed, and electromagnetic means for opening, against the action of said spring means, certain of the clutch devices to vary the drive connection.

4. In a variable speed gear of the epicyclic type, driving and driven members, gearing for establishing variable speed connections between the same, electromagnetic means for controlling said variable speed connections, a plurality of normally-closed, mechanically-operated clutch devices for effecting a direct drive connection between the driving and driven members, said clutch devices comprising members rotatable with one of said members and electromagnetic means for opening certain of said clutch devices to vary the drive connection.

5. In a variable speed gear of the epicyclic type, driving and driven members, clutch means for establishing a high speed, direct-drive connection between the same, said clutch means comprising a driving member having projections and a driven member having recesses to receive said projections, gearing operatively connected to said driven member to afford reduced speed connections, and electromagnetic means for controlling said connections, and spring means operative only on the deënergization of said electromagnetic means for establishing the direct-drive clutch connection.

6. In a variable speed gear of the epicyclic type, driving and driven members, gearing operatively interposed between the same to afford a variable speed drive connection, a plurality of clutch devices for effecting a direct-drive connection between the driving and driven members, spring means for maintaining said clutch devices normally closed, electromagnetic means operating against the action of said spring means to open certain of said clutch devices to vary the drive connection and electromagnetic means for retarding certain of the members of the driving connection.

7. In a variable speed gear of the epicyclic type, driving and driven members, a mechanically operated direct-drive connection between said members, electromagnetically controlled members adapted to be brought into engagement to effect a reduced speed connection between the driving and driven members and means to prevent relative movement between said electromagnetically controlled members when brought into engagement.

8. In a gear transmission, driving and driven members, a plurality of interposed clutch devices, means rendering said several clutch devices normally operative and electromagnetic means for selectively rendering said clutch devices inoperative, for the purpose described.

9. In a gear transmission, driving and driven members, a plurality of interposed clutch devices, means rendering said several clutch devices normally operative and electromagnetic means for selectively rendering said clutch devices inoperative, in combination with variable speed gears associated with the driven members and operated thereby.

10. In a gear transmission, driving and driven members, a plurality of interposed clutch devices, means rendering said several clutch devices normally operative and electromagnetic means for selectively rendering said clutch devices inoperative, in combination with variable speed gears associated with the driven members and operated thereby, together with electromagnetic means for selectively retarding said variable speed gears.

11. In a gear transmission, driving and driven members, gears associated with said driven members for securing a variable speed drive, and means normally establishing a direct drive connection to the driving member.

12. In a gear transmission, driving and driven members, gears associated with said driven members for securing a variable speed drive, and means automatically establishing a direct drive connection to the driving member.

13. In a gear transmission, driving and driven members, gears associated with said driven members for securing a variable speed drive, and mechanical means automatically establishing a direct drive connection to the driving member.

14. In a gear transmission, driving and driven members, gears associated with said driven members for securing a variable speed drive, electromagnetic means for controlling the variable speed gear connections, and means normally establishing a direct drive connection to the driving member.

In testimony whereof I have signed my name to this specification in the presence of two subscribing witnesses.

GEORGE POLLARD.

Witnesses:
M. W. ANDERSON.
R. BOWYER.